July 23, 1957 A. B. VIETH 2,799,905
MACHINE FOR CASTING STRAPS AND POSTS ONTO
GROUPS OF INSULATED BATTERY PLATES
Filed Oct. 22, 1954 4 Sheets-Sheet 2

INVENTOR.
Albert B. Vieth
BY
James Atkins
Attorney.

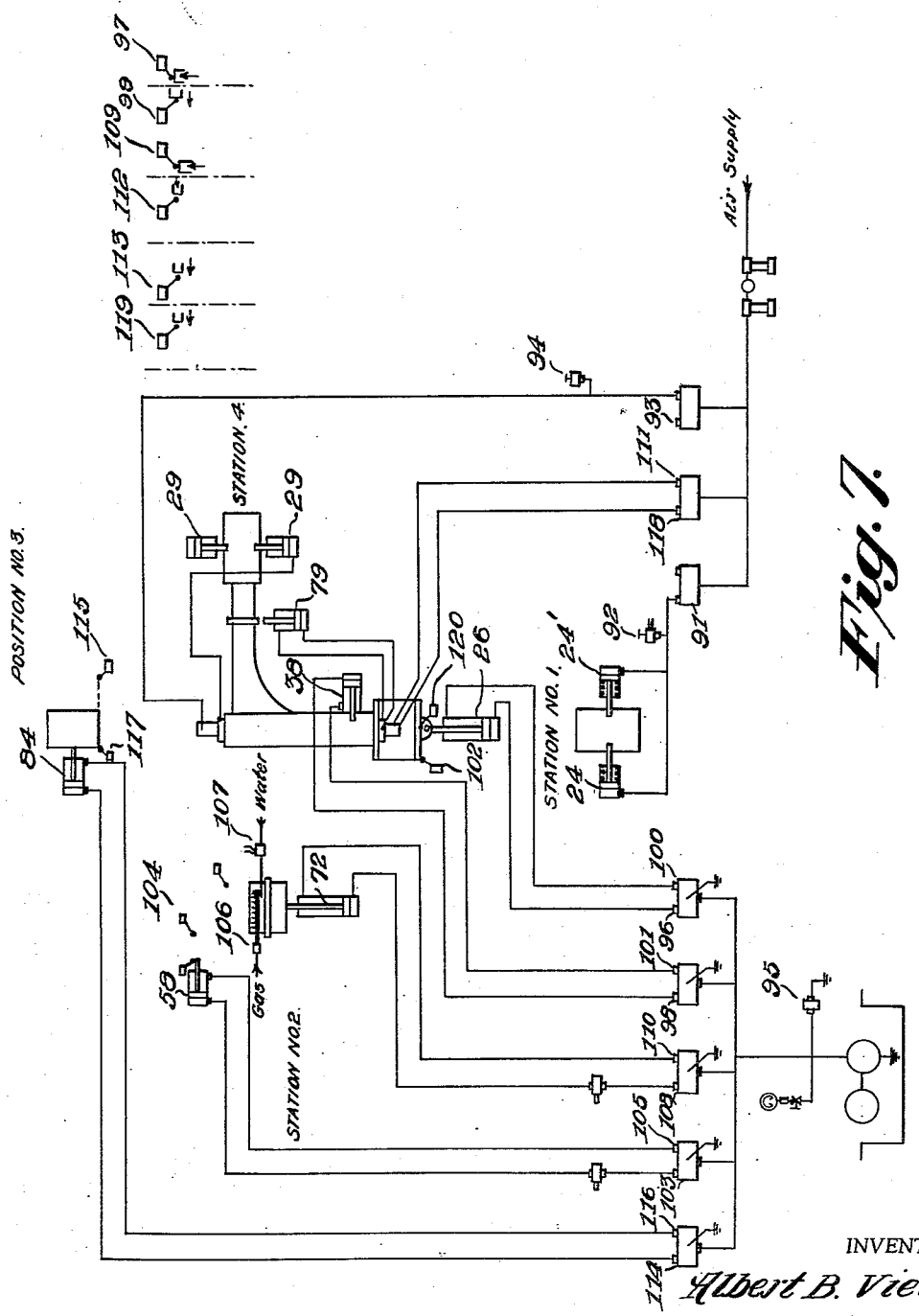

United States Patent Office 2,799,905
Patented July 23, 1957

2,799,905

MACHINE FOR CASTING STRAPS AND POSTS ONTO GROUPS OF INSULATED BATTERY PLATES

Albert B. Vieth, Hamburg, Pa., assignor to Price Battery Corporation, Hamburg, Pa., a corporation of Pennsylvania Application October 22, 1954, Serial No. 463,917

7 Claims. (Cl. 22—58)

This invention relates to an apparatus for casting straps and posts onto groups of insulated battery plates, and an improved machine for carrying the method into effect.

The invention is more particularly concerned with an improved method for casting elongated straps and posts on the free ends of the normally upwardly projecting lugs on battery plates separated by insulating plates, and a primary object is to support one or more groups of such plates for sequential movement between three operating stations, and the plates are subjected to an alignment operation at the first station, the straps and posts are cast on the lugs at the second station, and the insulating or separator plates are moved to proper position in the groups at the third station, whereat the groups are relieved of their support.

A further object of the invention is to provide a machine for carrying the method into effect, which includes a hopper for supporting groups of insulated battery plates in vertical position, a first station at which the plates are aligned, a second station at which the straps and posts are cast on the plates, and a third station at which the groups of strap-connected plates are released from the hopper, together with means for moving the hopper from one station to the other in timed sequence.

A further object of the invention is to provide a machine of the above noted general character, wherein the various controls for the cooperating structures of the machine are operated from a common cam shaft for providing proper sequence of operation.

A still further object of the invention is to provide a machine of the above noted general character, wherein the plate group supporting hopper is supported on an arm for rotation about a horizontal axis at right angles to the arm, and wherein said arm is supported by a vertical rotatable member for rotation therewith from one station to another and for movement axially thereof at the said stations.

A further object is to provide novel means for aligning the plate lugs at the first station in preparation for the casting of the straps thereon at the second station.

A still further object is to provide novel means for casting the straps and posts on the plate lugs at the second station.

A still further object is to provide means at the third station for causing the insulating or separator plates to move to aligned positions with their upper edges disposed at the bases of the battery plate lugs.

Other objects and advantages of the invention will become apparent in the course of the following detailed description taken in connection with the accompanying drawings, wherein:

Fig. 7 is a diagrammatic view showing the controls for the machine.

Fig. 8 is a perspective view of one of the completed groups of insulated battery plates, or a product of the present machine.

Figure 1:
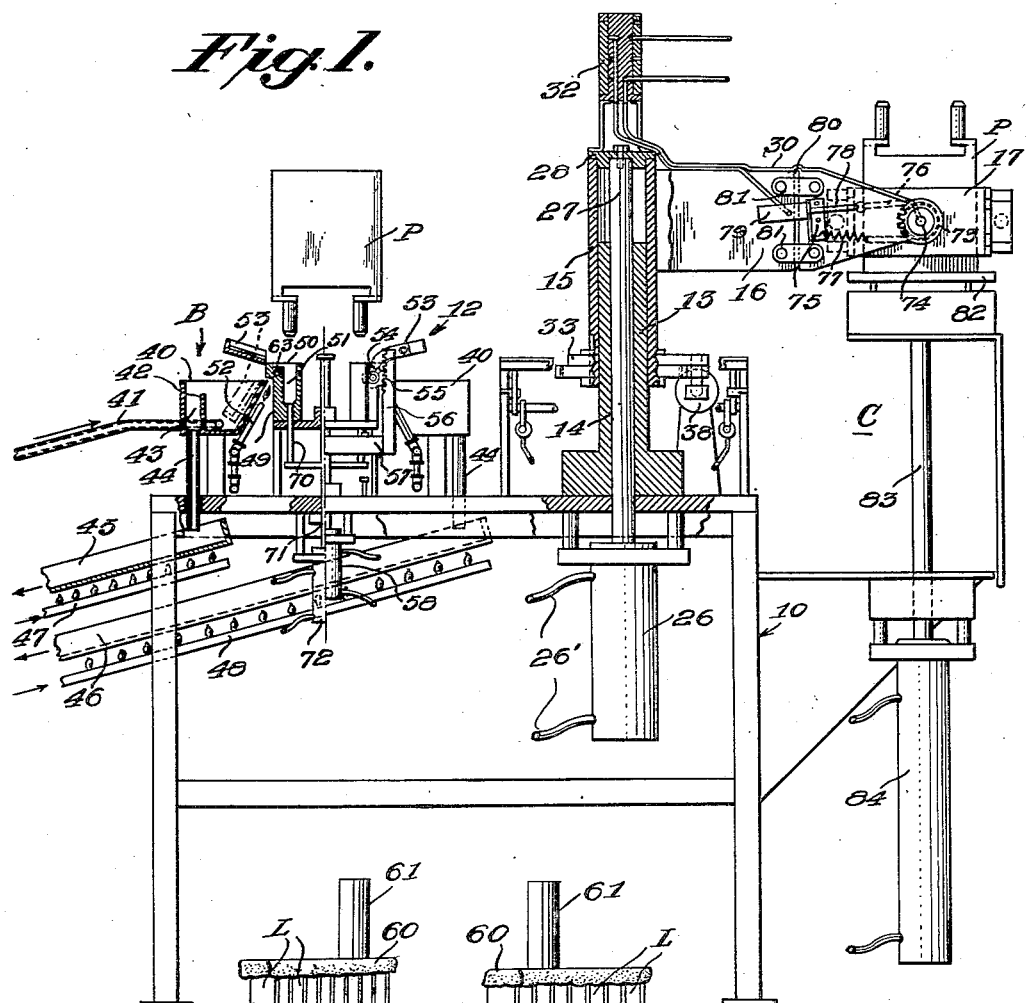
Figure 1 is a view of the machine partially in elevation and partially in vertical section and wherein the second and third stations only are shown.

Referring now in detail to the drawings, wherein is disclosed a preferred structural embodiment for carrying out the improved method, a suitable frame is indicated at 10 in Fig. 1 which provides a support for the cooperating structural elements now to be described.

Figure 2:
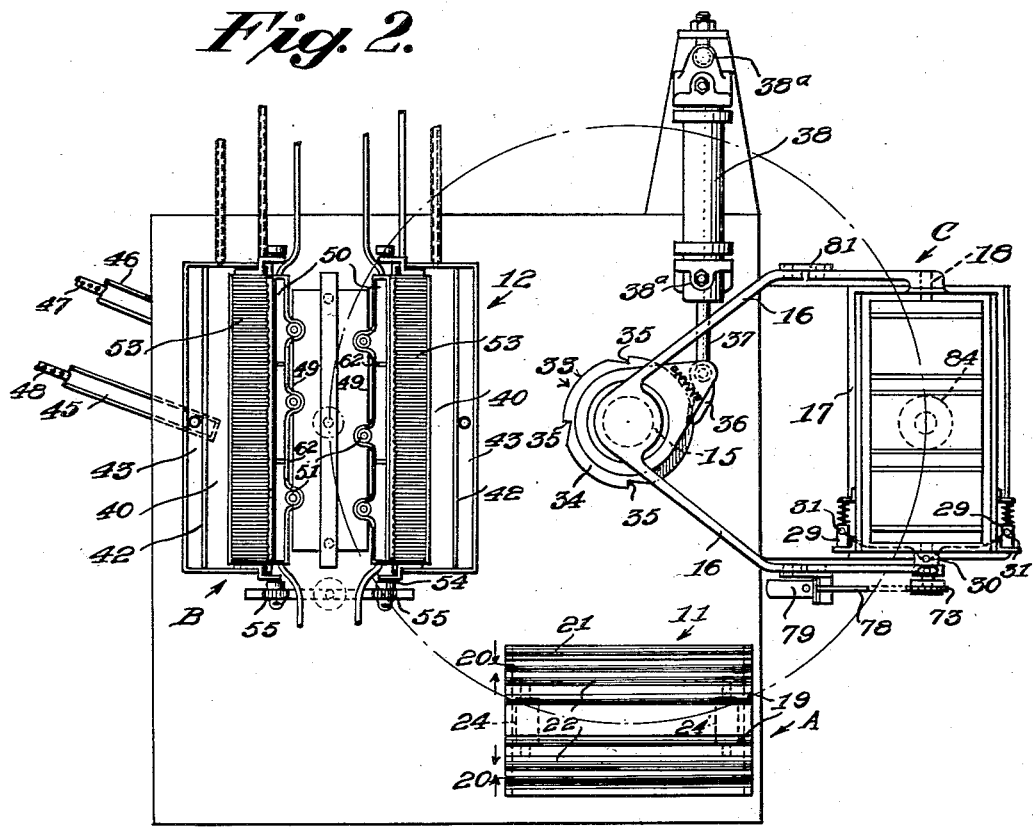
Fig. 2 is a top plan view of the machine and wherein the plate group supporting hopper is disposed at the third station.

As indicated more particularly in Fig. 2, a plate aligning structure 11 is supported on the frame 10 at the first station designated A.

A strap and post casting mechanism 12 is supported by the frame at a second station designated B, and which is disposed in 90° angular relationship to the first station A.

A third station C is provided at which the finished plate groups are deposited, and which station is disposed in 180° angular relationship to the station B.

Before proceeding with a detailed description of the structures disposed at the three stations A, B and C it is to be observed that the battery plates P are insulated from each other by separator plates S (Fig. 8) and that each battery plate P is provided with a lug L with the lugs on alternating plates being at one end of the group of plates and the lugs on the remaining plates being at the other end of the group of plates.

Upstanding from the frame 10 is a vertical support 13 which is provided with an axial bore 14, and journalled on the support 13 for both rotary and axial movement is a cylindrical member 15 which rigidly supports arms 16 projecting laterally therefrom and adjacent its upper end. The arms 16 receive a battery plate hopper 17 between their outer ends, and the hopper is pivotally connected to the arms as indicated at 18, whereby the hopper is capable of being swung through angles of 180°, for a purpose later to appear.

Figure 3:
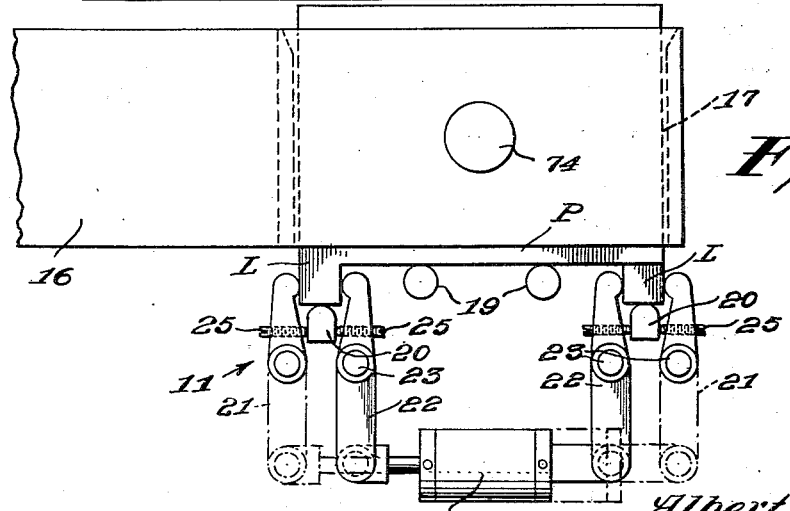
Fig. 3 is an elevational view showing the plate lug aligning means at the first station.
Figure 4:
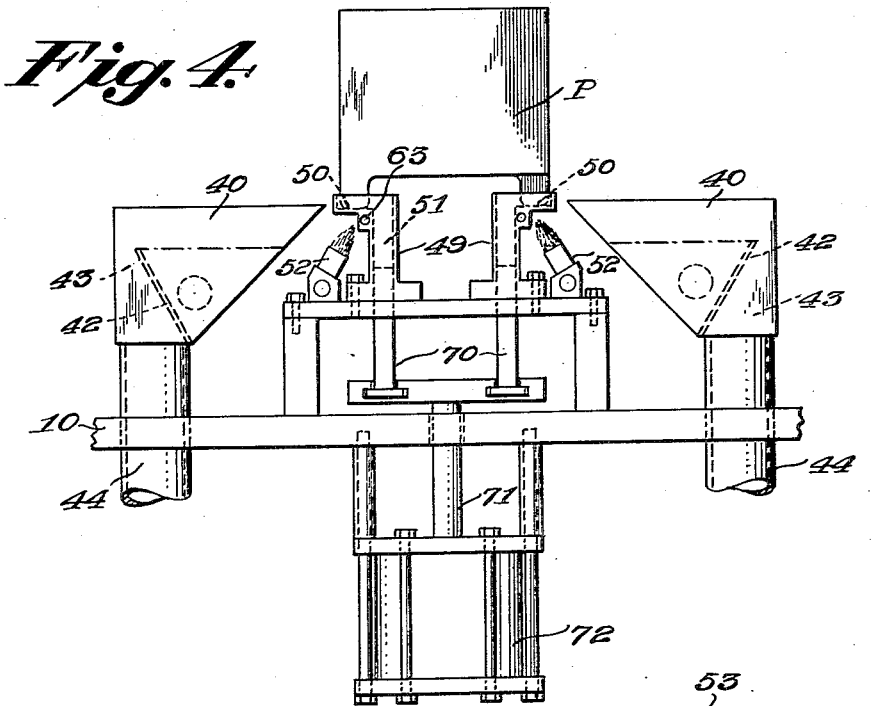
Fig. 4 is a somewhat diagrammatic elevational view of the casting structure disposed at the second station and wherein certain elements are omitted for sake of greater clarity of disclosure.

Reverting now to station A or the starting point of a strap casting operation, at which time the hopper 17 is disposed above the plate aligning mechanism 11 and with particular reference to Figs. 2 and 3, it will be seen that a pair of supports 19 are provided for supporting the lower edges of the plates P and the separators S intermediate the plate lugs L, and which supports may be vertically adjustable.

A second pair of supports 20, wich may also be vertically adjustable, are disposed in a position for supporting the lower edges of the lugs L, as is clearly indicated in Fig. 3.

The lugs L are disposable between the upper ends of aligning bars which comprise an outer pair 21 and an inner pair 22, and the lugs at corresponding ends of the plates being disposed between one pair of bars 21, 22, and the lugs at the other ends of the plates being disposed between the other pair of bars 21, 22.

The aligning bars 21, 22 are pivotally connected intermediate their ends, as at 23. A pneumatic cylinder 24 is operatively engaged with the inner bars 22, and a similar cylinder 24' (Fig. 2) is operatively engaged with the outer bars 21, as is indicated by dotted lines in Fig. 3, and the cylinders so operate through their pistons to move the upper ends of each pair of bars toward the support 20 with a resulting alignment of the lugs L.

The arms 21, 22 are preferably provided with adjustable set screws 25 whose inner ends are engageable with the supports 20 for effecting proper alignment of the lugs.

At this point it is to be observed that the hopper 17 has been lowered by the cylinder 26 provided with fluid conduits 26' and whose piston rod 27 is connected to the arm carrying cylindrical member 15 through a cap member 28.

After the alignment of the plates as in Figs. 2 and 3 the groups of plates are tightly pressed into face-to-face contact by means of cylinders 29, to which air is admitted through conduits 30 and 31 having communication with a rotary valve 32 supported by and above the cap 28. After having compressed the plates as above the cylinders 24 are operated to release the lug contacting arms 21, 22. The cylinder 26 is then again operated to move the arms 16 and hopper 17 upwardly to withdraw the depending lugs L from between the aligning arms 21, 22.

The cylindrical housing carrying member 15 is rotatable about the support 13 through an indexing mechanism 33 which comprises a ratchet disk 34 having four right-angularly disposed shoulders 35 which are sequentially engageable by a pawl 36 which is operated by the piston stem 37 of a cylinder 38 suitably supported by the frame and whose opposite ends are provided with ball joints 38a for allowing vertical movement of the hopper.

At this point it is to be observed that the ratchet disk 34 is connected to the cylindrical member 15 for rotation therewith but for movement axially thereof.

After the raising of the hopper 17 from the aligning bars 21, 22 the cylinder 38 is operated with one stroke of the piston rod 37 with a resulting quarter turn of the cylindrical member 15 and a corresponding 90° angular movement of the hopper 17 from station A to station B, with the aligned lugs extending downwardly over the casting mechanism 12.

The casting mechanism 12 comprises a pair of laterally spaced molten lead-receiving troughs 40 supported by frame 10 and into which lead is pumped through conduits 41 (only one of which is shown). Each of the troughs 40 is provided with a partition wall 42 which, with the adjacent wall of the trough, provides a lead overflow weir 43 with which communicates one end of a pipe 44 and whose opposite ends are open into the upper ends of lead return channels 45 and 46, which return the overflowed lead to a lead source having a pump operatively associated therewith.

The lead return channels 45 and 46 are heated by elongated gas burners 47 and 48, respectively, which are disposed beneath and adjacent the bottom walls of the channels.

Since the lead delivered to troughs 40 travels in a circuit and is maintained in a heated condition the lead may be continuously pumped from the lead source during repeated casting operations.

A pair of mold blocks 49 are disposed intermediate the lead troughs 40 in adjacent parallel relation thereto and each block is provided with a lead receiving channel 50 of a transverse configuration corresponding with that of the plate lug connecting straps to be cast. The channels 50 open through the upper ends of the blocks 49 and the blocks are further provided with cylindrical recesses 51 whose upper ends open into the channels and the walls of the recesses conform to the outer walls of the posts to be cast.

A gas burner 52 is disposed adjacent each block 49 for maintaining a molten condition of the lead.

Measured volumes of molten lead are transferred from the troughs 40 by means of a pair of ladles 53, which in accordance with Figs. 1 and 2 are pivotally connected to the blocks 49 as at 54, and each is provided with a gear wheel 55 having mesh with a vertical rack arm 56 of a frame 57, which is vertically movable by a cylinder 58, whereby the ladles may be moved from the lowered lead dipping position shown at the left in Fig. 1 to the upper mold block pouring position indicated in Fig. 1.

Immediately prior to the pouring of the lead into the mold blocks 49 the hopper 17 with the groups of aligned plates supported therein is lowered by cylinders 26 with the lugs L seated in the mold block channels 50.

Upon the pouring of lead into the channels same surrounds the lower ends of the lugs and also fills the recesses 51, providing elongated connecting straps 60 and posts 61, as indicated in Fig. 8.

At this point it is to be observed that the machine is capable of casting straps and posts on three separate groups of plates, and the straps on each group are provided with a single post.

In order to maintain the straps 60 individual to the separate groups the channels 50 are provided with partitions 62, as indicated in Fig. 2.

After having poured the lead into the channels in the formation of the straps and posts the lead is chilled by means of water circulated through conduits 63 which extend through the mold blocks adjacent the channels 50 as indicated in Fig. 1.

Figure 5:
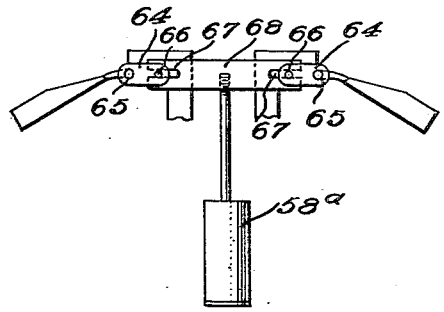
Fig. 5 is a fragmental diagrammatic elevational view of the ladle operating means.
Figure 6:
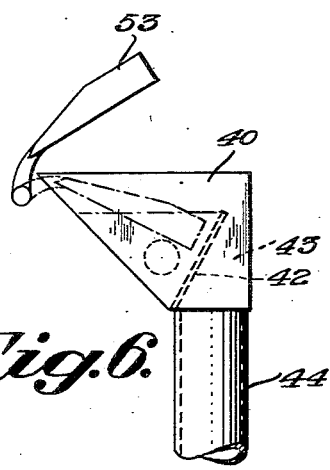
Fig. 6 is a fragmental diagrammatic elevational view showing the relation of a ladle to the mold and the lead overflow.

As an alternative to the above described operation of the ladles 53, same may be connected to links 64 (Fig. 5) which are pivotally connected to the blocks 49 as at 65, and the links are provided with adjacent pins 66 which extend through slots 67 in a bar 68 which is moved vertically by a cylinder 58a.

After proper cooling of the cast straps and posts in the mold blocks 49 the hopper 17 is again elevated, and in order to prevent breaking of or damage to the cast straps and posts in such elevating of the hopper, means is provided for ejecting the posts upwardly from the recesses 51, and such means comprises a plunger 70 reciprocably mounted in each block 49 with its upper end normally disposed at the bottom of a respective recess 51. The plungers are moved vertically by the piston rod 71 of an operating cylinder 72. The cylinder 72 is operated simultaneously with the cylinder 26 for movement of the cast straps and posts from the mold blocks 49 without any attendant strain.

After the elevating of the hopper 17 from the casting mechanism 12 at station B the cylinder 38 is again rendered operative for a two-cycle movement of the pawl 36, with a resulting rotation of the hopper through an angular range of 180° or from station B to station C. While in its movement from station B to station C, the hopper, with the groups of plates therein and having the straps and posts cast thereon, is rotated through an angle of 180° substantially at position 3 in Fig. 7 in order to present the plates at station C with the straps and posts being disposed uppermost, as is indicated in Fig. 1. Such rotation of the hopper is effected by means of a gear 73 secured to a stub shaft 74 rigid with the hopper and rotatable in the arms 16, the hopper having a like stub shaft at the side opposite the gear 73 for effecting pivotal mounting of the hopper between the arms 16.

An L-bracket 75 is secured to one of the arms 16. A short length of sprocket chain 76 has its mid-portion in driving engagement with the gear 73. One end of the chain 76 is connected to one end of a coil spring 77 whose opposite end is connected to the bracket 75 for drawing the chain in one direction, and the opposite end of the chain is connected to a piston rod 78 of an operating cylinder 79.

In order to provide for taut seating of the lugs L in the mold block channels 50 the arms 16 each comprise a pair thereof with adjacent edges 80 in slightly spaced relation, and the said pairs are connected by links 81.

Located at station C is a vertical vibratory table 82 which is vibrated by a piston rod 83 projecting upwardly from an operating cylinder 84. The purpose of the vibratory table is to shake down the separator plates to a position, as indicated in Fig. 8.

While the individual operating cylinders have been described in connection with the respective elements operated thereby, such cylinders are in practice controlled from a common cam shaft for rendering the machine substantially automatic and for proper timed sequence of operation.

At this point, reference is made to Fig. 7 which is a diagram of circuit connections and the various operating cylinders.

To start the machine into operation, a push button is operated to start the lead-propelling pump which will constantly deliver molten lead into the mold block channels 50.

A cycle button is then pushed which results in the following sequential operations. Solenoid 106 will be energized with a resulting turning on of the gas, solenoid 91 will be energized with a resulting operation of cylinders 24 and 24' and an alignment of the plates.

The switch 92 will energize the solenoid 93 with a resulting operation of cylinders 29 for effecting the clamping of the plates.

When pressure builds up, pressure-switch 94 will de-energize the solenoid 91 thereby releasing the alignment cylinders, and at the same time solenoids 95 and 96 will be energized. The pump will now build up pressure and cylinder 26 will raise the column. At the end of its stroke the column will contact the limit switch 97, thereby energizing solenoid 98 moving cylinder 38 and thereby indexing the column one-quarter turn. At the end of the turn, which is at station B, the limit switch 99 will be contacted, thereby energizing solenoid 100 with a movement of the cylinder 26 and a lowering of the column. Limit switch 99 will also de-energize the solenoid 98 and energize solenoid 101 bringing the indexing cylinder 38 back to its original position.

At the end of the down stroke the column 15 will contact the limit switch 102, thereby energizing the solenoid 103 and operating the cylinder 58 which tilts the ladles, contacting limit switch 104 at the end of its stroke, de-energizing the solenoid 103 and energizing the solenoid 105, thus returning the ladles to their original positions. At this time the cylinder 58 will contact the limit switch 104, starting a timer, which will, after a pre-determined time to permit settling, de-energize the solenoid 106, thereby turning off the gas and energizing solenoid 107, thereby turning off the water. The solenoid 108 will also be energized at the same time, causing operation of the ejecting cylinder 72. The ejecting cylinder 72 at the end of its stroke will energize solenoid 96 thereby operating cylinder 26 for upward movment of the column.

The column will contact the limit switch 109 at the end of its stroke, de-energizing solenoid 107, turning the water off and energizing solenoid 106, resulting in turning the gas on again. At the same time, solenoid 108 will be de-energized and solenoid 110 energized, thereby returning the ejecting cylinder 72 to its original position.

The limit switch 109 will also energize solenoid 98, thereby indexing the column and at the same time energizing solenoid 111 turning the hopper 180°. At the end of this turn, the limit switch 112 will be contacted, de-energizing solenoid 98 and energizing solenoid 101, thereby bringing cylinder 96 to its original position.

Since there is no more motion in the operating cycle a timer will de-energize solenoid 101 and energize solenoid 98, thereby indexing the column another one-quarter turn to the plate-discharging station. There the limit switch 113 will be contacted, thereby energizing solenoid 114 which controls cylinder 84 and the vibratory table. At the same time, solenoid 98 will be de-energized and solenoid 101 energized, thereby bringing index cylinder 38 back to its original position.

When the vibratory table 82 is in its upper position, it will contact switch 115 thereby de-energizing solenoid 93 and causing unclamping of the plates, and at which time the table will be returned to its normal position by energization of solenoid 116.

In the lowered position of table 82 switch 117 will be contacted and solenoid 98 will be energized with an indexing of the column to station No. 1 and solenoid 118 will also be energized with a resulting turning of the hopper 17 to its original position.

Upon arrival of the column to station No. 1, switch 119 will be contacted, and solenoid 100 will be energized, the column lowered causing energization of solenoid 101 which in turn causes return movement of the cylinder 38.

When the column arrives at its lower position, it will contact switch 120 with a resulting de-energization of solenoids 100, 101 and 95.

At this stage, the pump is unloading and the machine is ready for a succeeding cycle of operation.

In order to completely stop the machine, a "stop" button is pushed which results in stopping of the motor and also de-energization of solenoid 106, which effects turning off the gas.

Having set forth the invention in accordance with preferred specific structural embodiments thereof, what is claimed and desired to be secured by U. S. Letters Patent is:

1. In a machine for casting metallic straps and posts on the free ends of lugs projecting from corresponding edges of a group of battery plates separated by insulating plates; a plate group confining hopper supported by a vertical cylinder which is mounted for rotation about a vertical support to and from three successive operating stations, said hopper being further supported for rotation about a horizontal axis, means at the first station for alining the plates with the lugs thereof depending therefrom, means for rotationg said hopper about said vertical support from the first station to the second station, means at said second station for casting straps and posts on said depending lugs, said means adapted for further rotating said hopper and plates about said vertical support from said second station to a third station, means for rotating said hopper about said horiztonal axis through an angle of 180° intermediate said second and third stations for disposing the lugs upwardly, and means at said third station for settling the insulating plates, said hopper-rotating means comprising a ratchet disk surrounding said vertical cylinder and connected thereto for rotating same about said support, said disk being provided with circumferentially spaced shoulders, a pawl successively engageable with said shoulders, a piston stem having its outer end pivotally connected to said pawl, and a fluid cylinder having a piston to which said stem is secured.

2. The structure according to claim 1, wherein said hopper is further supported for movement along said vertical support, said support being provided with an axial bore, and means for successively lowering and raising the hopper at said first station, lowering and raising same at said second station, and lowering same at said third station, said raising and lowering means comprising a fluid cylinder supported by the frame, a piston rod projecting from the cylinder and extending through said bore and whose upper end is connected to said vertical cylinder.

3. In a machine for casting an elongated lead strap having a post projecting therefrom on the free ends of lugs projecting from corresponding edges of a group of battery plates insulated from each other by intervening separator plates, comprising a frame, a vertically disposed support, a vertical column disposed on the support for rotation about the axis thereof and for movement axially thereof, a hopper supported by the column for holding a group of battery plates and intervening separator plates, means supported by said frame at a first operating station for alining the plates, means for rotating the column through a predetermined angle to bring the hopper with alined plates to a second operating station including strap and post casting means, and said rotating means being further operative to move the hopper and group of plates with said straps and posts cast on the lugs thereof to a third operating station and means at said third operating station for settling the separator plates, said hopper being pivotally supported on a horizontal axis adjacent the outer ends of a pair of arms projecting laterally from said column, and fluid operable means for rotating said hopper on said axis through an angle of 180° in the movement of the hopper from the second station to the third station.

4. In a machine for casting an elongated lead strap having a post projecting therefrom on the free ends of lugs projecting from corresponding edges of a group of battery plates insulated from each other by intervening separator plates, comprising a frame, a vertically disposed support, a vertical column disposed on the support for rotation about the axis thereof and for movement axially thereof, a hopper supported by the column for holding a group of battery plates and intervening separator plates, means supported by said frame at a first operating station for alining the plates, means for rotating the column through a predetermined angle to bring the hopper with alined plates to a second operating station including strap and post casting means, and said rotating means being further operative to move the hopper and group of plates with said straps and posts cast on the lugs thereof to a third operating station, means at said third operating station for settling the separator plates, and a vertical vibrating table at said third station upon which said plates are disposable with the lugs uppermost for settling the separator plates.

5. In a machine for casting an elongated lead strap having a post projecting therefrom on the free ends of lugs projecting from corresponding edges of a group of battery plates insulated from each other by intervening separator plates, comprising a frame, a vertically disposed support projecting upwardly from said frame and provided with an axial bore, a vertical column in the form of a cylindrical member telescoped over said support for movement axially thereof, a pair of arms rigid with said cylindrical member, a hopper pivotally supported by the outer ends of said arms for holding a group of battery plates and intervening separator plates, means supported by said frame at a first operating station for alining the plates, means for rotating said column through a predetermined angle to bring the hopper with alined plates therein to a second operating station including strap and post casting means, said rotating means being further operative to move the hopper and group of plates with said straps and posts cast on the lugs thereof to a third operating station, means at said third operating station for settling the separator plates, and vertically movable means extending through said bore in said support operatively engaged with said column for sequentially lowering and elevating said hopper at the first operating station, sequentially lowering and elevating said hopper at said second operating station and lowering said hopper at the third operating station, said alining means comprising a pair of vertical bars pivotally supported intermediate their ends for disposition of each set of lugs therebetween, cylinder operable means for pivotally moving the bars of each pair thereof into engagement with opposed edges of the lugs, supports for the free ends of the lugs disposed between the bars of each pair thereof, and supports for the lower edges of the plates disposed between the pairs of bars.

6. The structure according to claim 5 wherein said strap and post casting means comprises a pair of spaced mold blocks each having a molten metal receiving channel in the upper end thereof and into which channels, the said lugs are disposable, a plurality of transverse partitions in each of said channels and each of said blocks being provided with cylindrical vertical recesses whose upper ends open into the channels between the opposite ends thereof and said partitions, a molten metal trough adjacent to and parallel with each mold block, means for supplying molten metal to said troughs, a ladle pivotally supported on each trough, and means for rotating the ladles about their pivotal axes for transferring measured volumes of molten metal from said troughs to said block channels, a plunger supported by said blocks beneath each recess, and means for imparting vertical movement to the plungers in synchronism with elevating movement of the hopper at said second operating station.

7. The machine according to claim 5, wherein said hopper comprises means for clamping the plates after alinement of the lugs, said means comprising a pair of fluid cylinders disposed at opposite sides of and adjacent one end of the hopper, a rotary valve supported by said vertical column, and fluid conduits having their opposite ends communicating with said cylinders and said rotary valve.

References Cited in the file of this patent

UNITED STATES PATENTS

| | | |
|---|---|---|
| 1,220,211 | Feldkamp | Mar. 27, 1917 |
| 1,274,016 | Disinger | July 30, 1918 |
| 1,570,658 | Wickland et al. | Jan. 26, 1926 |
| 1,936,218 | Watkins | Nov. 21, 1933 |
| 1,948,120 | Lormor | Feb. 20, 1934 |
| 2,028,790 | Lund | Jan. 28, 1936 |
| 2,516,546 | Brown | July 25, 1950 |
| 2,542,503 | Galloway | Feb. 20, 1951 |
| 2,655,700 | Snelson | Oct. 20, 1953 |
| 2,727,287 | Lund | Dec. 20, 1955 |